United States Patent
De Boom et al.

(10) Patent No.: US 6,360,579 B1
(45) Date of Patent: Mar. 26, 2002

(54) FLOWMETER CALIBRATION SYSTEM WITH STATISTICAL OPTIMIZATION TECHNIQUE

(75) Inventors: Robert J. De Boom, Longmont; Marc Allan Buttler, Estes Park; Julie Gniffke, Superior; Joe J. Longo, Boulder, all of CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 09/277,428

(22) Filed: Mar. 26, 1999

(51) Int. Cl.[7] ............................................... G01F 25/00
(52) U.S. Cl. ........................................................ 73/1.35
(58) Field of Search ................... 73/1.16, 1.35, 73/861.356

(56) References Cited

U.S. PATENT DOCUMENTS

| | | | | |
|---|---|---|---|---|
| 476,095 A | * | 5/1892 | Thomson | 73/1.35 |
| 899,960 A | * | 9/1908 | Dornin | 73/1.35 |
| 2,768,522 A | * | 10/1956 | Henke | 73/1.35 |
| 3,444,724 A | * | 5/1969 | Gilpin | 73/1.16 |
| 4,252,028 A | | 2/1981 | Smith et al. | |
| 4,876,879 A | | 10/1989 | Ruesch | |
| 5,072,416 A | * | 12/1991 | Francisco et al. | 73/1.19 |
| 5,233,861 A | * | 8/1993 | Gore et al. | 73/1.35 |

OTHER PUBLICATIONS

"Automated Secondary Standard for Liquid Flowmeters," NASA Tech Brief, National Aeronautics and Space Administration (Cleveland, Ohio, USA), (1976, XP–002141447).

* cited by examiner

Primary Examiner—Harshad Patel
(74) Attorney, Agent, or Firm—Chrisman, Bynum & Johnson, P.C.

(57) ABSTRACT

A flow meter calibration system uses a plurality of Coriolis effect mass flow meters formed in two arrays to calibrate a meter under test. The system adjusts flow rates to optimum levels for certainty of measurement and performs a statistical analysis permitting the system to be used even in the calibration of other Coriolis flowmeters.

33 Claims, 3 Drawing Sheets

FLOWMETER CALIBRATION SYSTEM WITH STATISTICAL OPTIMIZATION TECHNIQUE

FIELD OF THE INVENTION

The present invention pertains to systems that are used in calibrating flowmeters for purposes of assuring accuracy from the meter which is calibrated. More specifically, the system uses statistical analysis to calibrate volumetric flowmeters, mass flowmeters, densitometers, and viscosimeters in situations where the meter being calibrated can be of the same type as the standardized meter.

PROBLEM

It is often desirable to perform periodic maintenance upon flow meters that are placed in service. One aspect of this maintenance is to calibrate the meters for the purpose of ensuring accurate and reliable measurement data. As used in the discussion below, the term "standard meter" is hereby defined to mean a meter that has been calibrated according to precise standards where this calibration permits the meter to be used as a standard measurement tool for use in calibrating other meters. The term "service meter" refers to a meter that is normally in use obtaining measurement data for a specified purpose, but periodically requires calibration to ensure the accuracy of this measurement data. A standard meter is also a service meter in the sense that the standard meter is normally in use obtaining measurement data for the purpose of calibrating other meters, and a standard meter itself requires periodic calibration.

The purpose of a meter calibration effort is to ascertain a flow calibration factor that is used to convert electronic signals to direct measurements of mass, volume, and other information from the meter under test. Coriolis meters and positive displacement meters are known in the art as linear meters, i.e., the flow calibration factor is a constant with respect to flow rate. Other meters including orifice meters, magnetic flow and vortex meters are nonlinear meters where the flow calibration factor varies with flow rate.

The calibration process typically entails removing the meter from service for shipment to a test facility where the meter is cleaned, repaired as needed, and subjected to test measurements. The most common calibration measurements usually involve the use of a gravimetric diverter system to flow through the meter under test a standard fluid having precisely known intrinsic and extrinsic fluid properties, e.g., temperature, density, viscosity, and volume. The meter under test performs flow measurements on this fluid, and these measurements are cross checked against the known fluid properties. Gravimetric diverter systems may be designed for testing purposes across a wide range of flow rates, but the additional structure that is required to provide this functionality is so large as to make transportation of these systems impracticable.

The use of gravimetric diverter systems to test flowmeters is relatively time consuming and expensive. The gravimetric diverter systems themselves occupy relatively large volumes of space. The loss of time, space and money can be reduced by calibrating very precise meters, i.e., standard meters, against gravimetric standards for subsequent use in calibrating other meters under test. During the course of calibration tests, these standard meters are connected in series with the meter under test to perform simultaneous flow measurements. The measurement data from the meter under test is used in calculations with measurement information from the standard meter on the same fluid volume to provide or confirm a flow calibration factor for the meter under test.

Flowmeters can never be relied upon to provide measurement data that is completely accurate because there are always small uncertainties in the meter output. For example, many Coriolis flowmeters sold by Micro Motion, Inc., of Boulder, Colo., are specified to be accurate within 0.1 percent of the total mass flow rate within a selected operating range of flow rates. Many of these meters are capable of even more outstanding accuracy down to less than 0.01 percent within subportions of this range. There is no one single flowmeter that provides this outstanding level of accuracy across all flow rates. Coriolis flowmeters have been designed to perform mass flow rate measurements on flows ranging from less than 0.1 lbs/min to greater than 25,000 lbs/min.

Coriolis effect mass flowmeters are well known and have been described in numerous patents, e.g., in U.S. Pat. Nos. 4,444,059, 4,491,025, and 4,422,338 to Smith, which all describe mass flow rate meters that use vibrating tubes to impart measurable Coriolis effects which are related to mass flow rate. U.S. Pat. No. 4,491,009 to Ruesch describes a vibrating tube densitometer based upon the structure of a Coriolis mass flowmeter. The ability of Coriolis effect mass flowmeters to measure density permits the determination of a volumetric flow rate by a simple division of the density value into the mass flow rate value. It is also well known that Coriolis effect mass flowmeters can be operated as viscosimeters.

The total level of uncertainty in a flow measurement arises from random uncertainties and systematic uncertainties in the meter together with its environment of use. The metering industry has generally considered these uncertainties and published official guidelines for quantifying and managing meter uncertainties, as in ISO-5168, which is hereby incorporated by reference to the same extent as though fully disclosed herein.

The metering industry uses a rule of thumb advantage that requires the uncertainty in output from a standard meter to be at least three times better that the manufacturer's accuracy specification of a meter under test. Thus, a service meter that is specified as being accurate to 0.1 percent of a flow rate requires a standard meter that is accurate to 0.033 percent for calibration purposes.

Coriolis mass flow meters are the most accurate type of meter known for practical use through many flow regimes. The meters are generally insensitive to flow profile, and calibration factors that are developed using liquid fluids work equally well when applied to gas fluids in service. There is no known or readily available metering technology with superior accuracy for use as a measurement standard against Coriolis effect mass flow meters.

Some problems could arise when using Coriolis meters as the standard meters to calibrate Coriolis service meters. Where the two Coriolis meters have similar or identical manufacturer's accuracy specifications, it becomes impossible to gain the rule of thumb advantage requiring uncertainty in the standard meter to be three times better than the manufacturer's accuracy specification in the meter under test. This situation digresses into a requirement for relatively expensive gravimetric testing of the service meter.

There exists a need for a compact flowmeter calibration system including standard meters that are operable across a wide range of flow rates with sufficient accuracy for use as a standard metering system. The system should be operable for calibrating linear and nonlinear meters. The system should also be modular so it can be manufactured, shipped and installed easily. The system can also be transported for calibration of meters at remote sites where meters are in service, as opposed to the present practice of removing the meters from service and shipping the meters to a flow laboratory for calibration purposes.

SOLUTION

The present invention overcomes the problems that are outlined above and advances the art by providing a compact flowmeter calibration system including a plurality of standard meters with sufficient accuracy for use as standard meters across a wide range of flow rates. The system is operable for calibrating both linear and nonlinear meters through a wide range of flow rates. The system is also easily transported to remote locations for calibration testing, and can be broken down into modular components for further ease of transportation and storage.

As used herein, the term "calibration" is defined to mean a flow measurement test that provides data which is used to either improve the accuracy of a flowmeter or to verify the accuracy of a flowmeter. Improvement of flowmeter accuracy is most often done by changing a flow calibration factor for the meter. The term "flowmeter" is defined to mean any meter having the ability to measure intrinsic or extrinsic fluid properties when placed in a service location where the fluid is normally flowing. Flowmeters include densitometers and viscosimeters, as well as mass flow rate and volumetric flow rate meters. Volumetric rate flowmeters are preferred for use in systems according to the present invention, and mass rate flowmeters are especially preferred. The term "fluid" is defined to include liquids; gasses; mixtures of liquids and gasses; mixtures of liquids and solids that primarily exhibit liquid behavior; mixtures of gasses and solids that primarily exhibit gas behavior; and mixtures of gasses, liquids, and solids that primarily exhibit liquid or gas behavior. The term "uncertainty" means a combination of random and systematic uncertainties that is performed according to any convention that is accepted in the metering art, at least including international standards such as ISO-5168.

The flowmeter calibration system includes a mechanism for supplying fluid to use in flow calibration measurements. The system performs flow measurements upon this fluid in a succession of three steps. The first step is a quality check step that is performed using a first flowmeter array. The second step includes performing flow measurements using a service meter under test. The third step is a standard meter measurement that is performed using a second flowmeter array. A controller, based on statistical comparison analysis between the first and second arrays, directs the flow rate through the system to optimize the accuracy or sensitivity of measurements in both flowmeter arrays. The flow measurements are used to calculate or confirm a flow calibration factor for use in the meter under test. The same principles apply whether the meter under test is being calibrated for mass flow rate, volumetric flow rate, density, or viscosity measurements.

Preferred embodiments of the flowmeter calibration system incorporate a modular design for ease of transport and storage. The system can be separated into its respective subassemblies including the first flow meter array, the second flowmeter array, and the fluid supply mechanism. It is often the case that calibration can be performed using a preexisting fluid supply at the test site and, consequently, it is not always necessary to transport a fluid supply means with the test system.

The fluid supply mechanism can provide any fluid that is compatible with the system hardware; e.g., a liquid reservoir and a pump; a multiphase fluid including multiple immiscible liquid phases and gas; an attachment to a pressurized water supply, such as plant process fluids, a city water supply, artesian well, or gravimetric system; and a pressurized gas supply, such as natural gas, air, or plant process gasses. A constant pressure source of water is the preferred supply mechanism for use in calibrating Coriolis flowmeters.

The first flowmeter array and the second flowmeter array each contain at least one flowmeter. The first flowmeter array is operably configured to receive fluid from the fluid supply mechanism. A meter under test is positioned in the flow pathway between the first flowmeter array and the second flowmeter array. It is intended that all of the fluid passing between the first flowmeter array and the second flowmeter array must pass through the meter under test. A number of arrays may be connected in parallel to accommodate extremely large flow volumes.

It is much preferred that the first flowmeter array and the second flowmeter array each contain a plurality of flowmeters, and that these flowmeters are Coriolis effect mass flowmeters. The flowmeters of each array have different flow capacities and different flow ranges of optimal measurement sensitivity corresponding to relatively low uncertainty. Each meter in the first flowmeter array preferably has a substantially identical match in the second flowmeter array. The flowmeters in each array are configured to flow in parallel with respect to one another, as opposed to series flow within each array.

Each of the first flowmeter array, the second flowmeter array, and the meter under test provide flow measurement signals to a central CPU-based controller. The controller opens and closes automated valves leading to each meter for the purpose of adjusting flow through each meter into the range of optimal measurement sensitivity corresponding to relatively low uncertainty for each meter.

Prior to insertion of the meters in the arrays the meters are characterized against a traceable reference standard to determine the range over which the meter meets the uncertainty requirements. These characterizations are used by the controller to interpret the data from the meters in the arrays. These meter characteristics, in combination with the controlled ability to flow through optimal ranges of the standard meters, advantageously permits Coriolis technology meters to be used in the calibration of similar or identical Coriolis technology meters.

These aspects and advantages of the present invention are apparent based upon the discussion to follow. It is an aspect of the present invention to:

provide a standard metering system that is capable of calibrating both linear and nonlinear flowmeters;

provide calibration measurements across a wide range of flow rates ranging from less than 0.1 lb/min to 7000 lbs/min or even greater than 25,000 lbs/min;

achieve calibration of a Coriolis meter under test using Coriolis meters as the calibration standard in flow ranges where there exists no practical superior metering technology to Coriolis technology;

provide complete automation of the calibration process;

provide a compact system that can be used to calibrate flowmeters across a wide variety of flow rates while occupying less space than conventional diverter gravimetric systems;

provide a design that is optionally transportable on a small truck and can be easily assembled from modular components for ease of transportation and storage; and calibrate volumetric meters using temperature, pressure, and mass based references.

DETAILED DESCRIPTION OF THE PREFERRED EMBODIMENT

Figure 1:
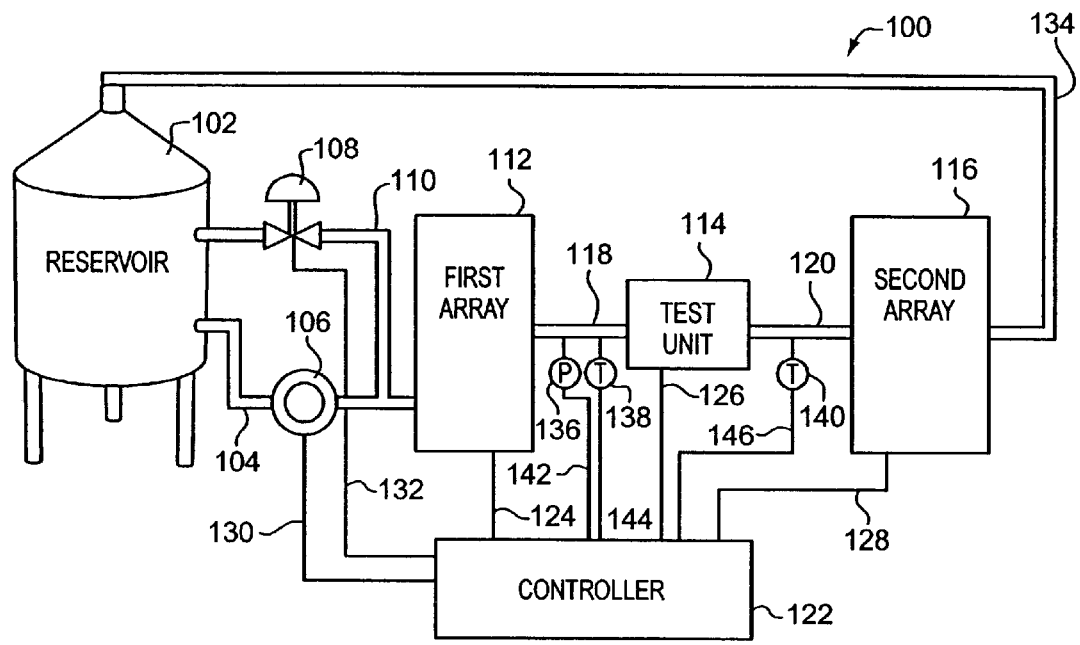
FIG. 1 depicts a block schematic diagram of a meter calibration system according to the present invention.

FIG. 1 depicts a flowmeter calibration system 100. A reservoir 102 contains water or another liquid, which is pressurized in tubing 104 by the action of gravity and an optional pump 106. An automated valve 108 may be partially opened to permit a portion of the flow from pump 106 to bypass flow through system 100. A first flowmeter array 112 is positioned to receive liquid from tubing 104 under the pressure influence of pump 106. A meter under test or test unit 114 is positioned between first flowmeter array 112 and a second flowmeter array 116. The term "test unit" is used here because a single meter may be tested or a plurality of similar meters may be connected in series for simultaneous calibration testing. The testing of meters in series significantly enhances the test process efficiency because flow measurement data from a single test perceived by first flowmeter array 112 and second flowmeter array 116 can be used to calibrate each meter in series within test unit 114, as opposed to having to run separate volumes through the arrays while testing each meter.

Test unit 114 receives liquid through tubular segment 118 and, in turn, passes this liquid to second flowmeter array 116 through tubular segment 120. A CPU-based controller 122 is in electrical contact with each of first flowmeter array 112, test unit 114 and second flowmeter array 116 through corresponding cables 124, 126, and 128. Controller 122 is also in electrical contact with pump 106 and valve 108 through corresponding cables 130 and 132. Tubing 134 provides a return of fluid from second flowmeter array 116 to reservoir 102.

A pressure indicating recorder 136 and a temperature indicating recorder 138 are mounted in tubular segment 118, i.e., upstream of test unit 114. A temperature indicating recorder 140 is mounted in tubular segment 120, i.e., downstream of test unit 114. These devices are in operable contact with controller 122 through cables 142, 144, and 146 for the receipt and transmission of signals. The pressure indicating recorder 136, temperature indicating recorder 138, and temperature indicating recorder 140 provide data that is used according to conventional practices in obtaining density measurements from test unit 114 when it contains a Coriolis flowmeter. Pressure and temperature data from the positions shown for pressure indicating recorder 136, temperature indicating recorder 138, and temperature indicating recorder 140, are also required to perform volumetric measurements when the test unit 114 contains a volumetric flow meter, such as a positive displacement meter or orifice meter.

In operation, the meter under test 114 has been newly manufactured or recently removed from a normal service position (not depicted in FIG. 1), such as a position where it measures the flow of an intermediate product in a chemical plant. Meter under test 114 has just been installed into position contacting tubular segments 118 and 120 for calibration test purposes, and the portion of system 100 downstream of reservoir 102 has been bled of air and other gasses. Controller 122 actuates pump 106 to flow liquid from within reservoir 102 in series into first flowmeter array 112, meter under test 114 and second flowmeter array 116, which each perform simultaneous flow measurements on the liquid. Controller 122 synchronizes these simultaneous measurements. The synchronous measurements avoid the possibility of obtaining flow measurements at different times where the flow measurements may be influenced by pressure surges or pulses from the action of pump 106. Controller 122 operates, as described in greater detail below, to assure that respective flowmeters within second flowmeter array 116 are operating at flow rates making it at least ninety-five percent certain that the uncertainty of measurements obtained from second flowmeter array 116 are at least three times more accurate than the manufacturer's performance specification that is allocated to meter under test 114.

Figure 2:
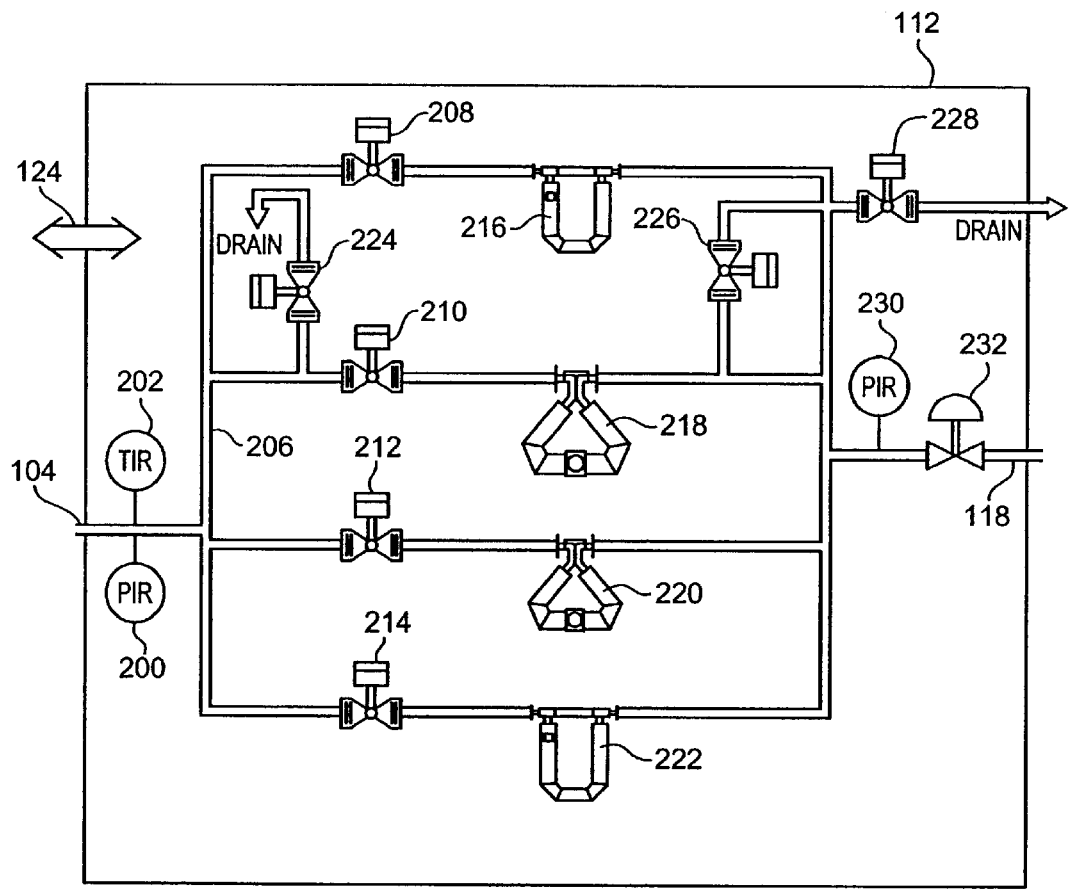
FIG. 2 provides additional detail with respect to a first flowmeter array within the system shown in FIG. 1.

FIG. 2 provides additional detail with respect to first flowmeter array 112. A pressure indicating recorder 200 and a temperature indicating recorder 202 are operably mounted on tubing 104. Tubing 104 leads to a tubing manifold 206 that distributes flow through automated valves 208, 210, 212, and 214. These automated valves are actuated and controlled by controller 122 (see FIG. 1) through signals on cable 124 to direct the flow rate into one or more of the Coriolis flowmeter/flow signal transmitter combinations 216, 218, 220, and 222. Automated valves 208, 210, 212, and 214 are normally in either a fully open or fully closed position, as determined by controller 122 (see FIG. 1).

Each of the Coriolis flowmeter/flow signal transmitter combinations 216, 218, 220, and 222 has an optimum accuracy, i.e., a minimum uncertainty, within a specific flow range corresponding to the individual meter. Automated valves 224, 226, and 228 open to vent air or drain first flowmeter array 112. Tubular segment 118 contains a pressure indicating recorder 230 and an automated valve 232 that is used to isolate first flowmeter array 112 when test unit 114 is removed. Each of pressure indicating controllers 200 and 230, temperature indicating recorder 202, Coriolis flowmeter/flow signal transmitter combinations 216, 218, 220, and 222, as well as automated valves 208, 210, 212, 214, 224, 226, 228, and 232, are in contact with controller 122 on cable 124 for the transmission of signals.

Figure 3:
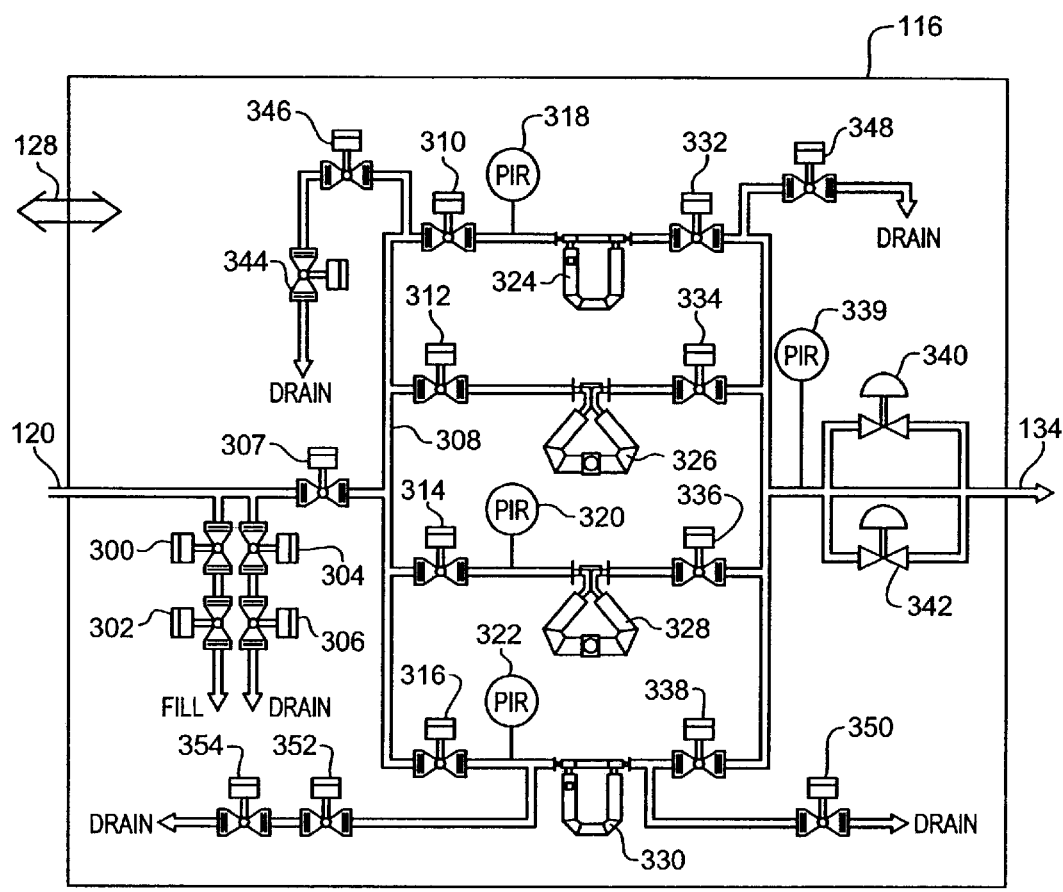
FIG. 3 provides additional detail with respect to a second flowmeter array within the system shown in FIG. 1.

FIG. 3 provides additional detail with respect to second flowmeter array 116. Tubular segment 120 contains automated valves 300 and 302, which selectively open and close to fill test unit 114. Similarly, automated valves 304 and 306 selectively open and close to vent or drain test unit 114. Automated valve 307 selectively opens and closes to isolate second flowmeter array 116 when unit under test 114 is removed. Tubular segment 120 connects with tubular manifold system 308, which distributes fluid through automated valves 310, 312, 314, and 316 leading to pressure indicating recorders 318, 320, 322, and Coriolis flowmeter/flow signal transmitter combinations 324, 326, 328, and 330. The automated valves 310, 312, 314, 316, 332, 334, 336, and 338 are normally in either a fully open or fully closed position, as designated by controller 122 (see FIG. 1). Tubing 134 contains a pressure indicating recorder 339 together with automated valves 340 and 342, which open or close to selected positions to control the flow rate through the calibration system 100 and second flowmeter array 116.

Automated valves 344, 346, 348, 350, 352, and 354 are selectively available to vent or drain air or liquid from second flowmeter array 116. Second flowmeter array 116 communicates with controller 122 (see FIG. 1) over cable 128.

Identification of Optimized Range for Meter Uncertainty

Figure 4:
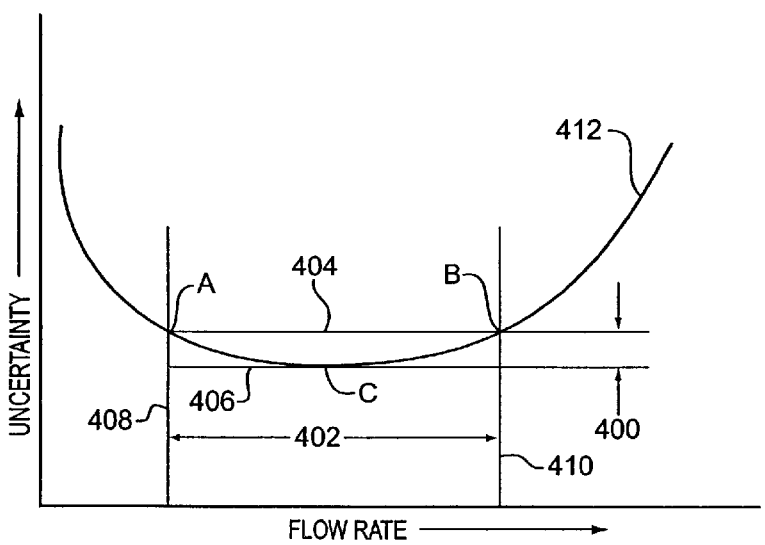
FIG. 4 depicts a generalized curve of meter uncertainty versus flow rate.

As stated above each of the Coriolis flowmeter/flow signal transmitter combinations 216, 218, 220, 222, 324, 326, 328, and 330 has been tested to ascertain an optimal range of minimized uncertainty. This rigorous testing process typically requires several days because multiple flow rates are involved. FIG. 4 shows a generalized plot of uncertainty versus flow rate for a typical Coriolis flowmeter. An optimized range of uncertainty is shown as a minimum uncertainty interval 400 that exists across a flow rate range 402 that is optimized for minimum uncertainty. Interval 400 and range 402 are defined by the greater of points A or B corresponding to horizontal line 404 as the upper limit of interval 400, and point C corresponding to horizontal line 406 as the lower limit of interval 400. Similarly, vertical lines 408 and 410 pass through points A and B to define range 402.

The magnitude of interval 400 is determined by the 3:1 rule of thumb advantage that is desired for calibrating a flowmeter. That is, the standard meter should have an uncertainty that is three times better than the manufacturer's accuracy specification in the meter under test. For example, where the manufacturer's accuracy specification is 0.1 percent uncertainty in the flow rate, the interval 402 would be 0.033. The range 402 is any range of flow rates that provides this uncertainty, and is preferably the widest range of flow rates from curve 412 that provides the rule of thumb advantage. The interval 400 can also be selected to correspond to other advantages, e.g., a 4:1 or 2:1 advantage, as is deemed to be acceptable under the circumstances. Within a given flowmeter array, these ranges sometimes overlap between different meters, and it is then preferable to use a meter having a relatively smaller total flow capacity because smaller meters generally have lower uncertainties at low flow rates.

While each meter should be subjected to individual testing for standardization purposes, the following ranges are generally applicable to the line of flowmeters offered for sale by Micro Motion of Boulder, Colo.:

| Meter Model Number | Optimized Range of Minimum Uncertainty (lb/min) |
| --- | --- |
| CMF010 | 0.5–3 |
| CMF025 | 4–30 |
| CMF050 | 25–100 |
| CMF100 | 60–400 |
| CMF200 | 350–900 |
| CMF300 | 800–3200 |

System Operation

Figure 5:
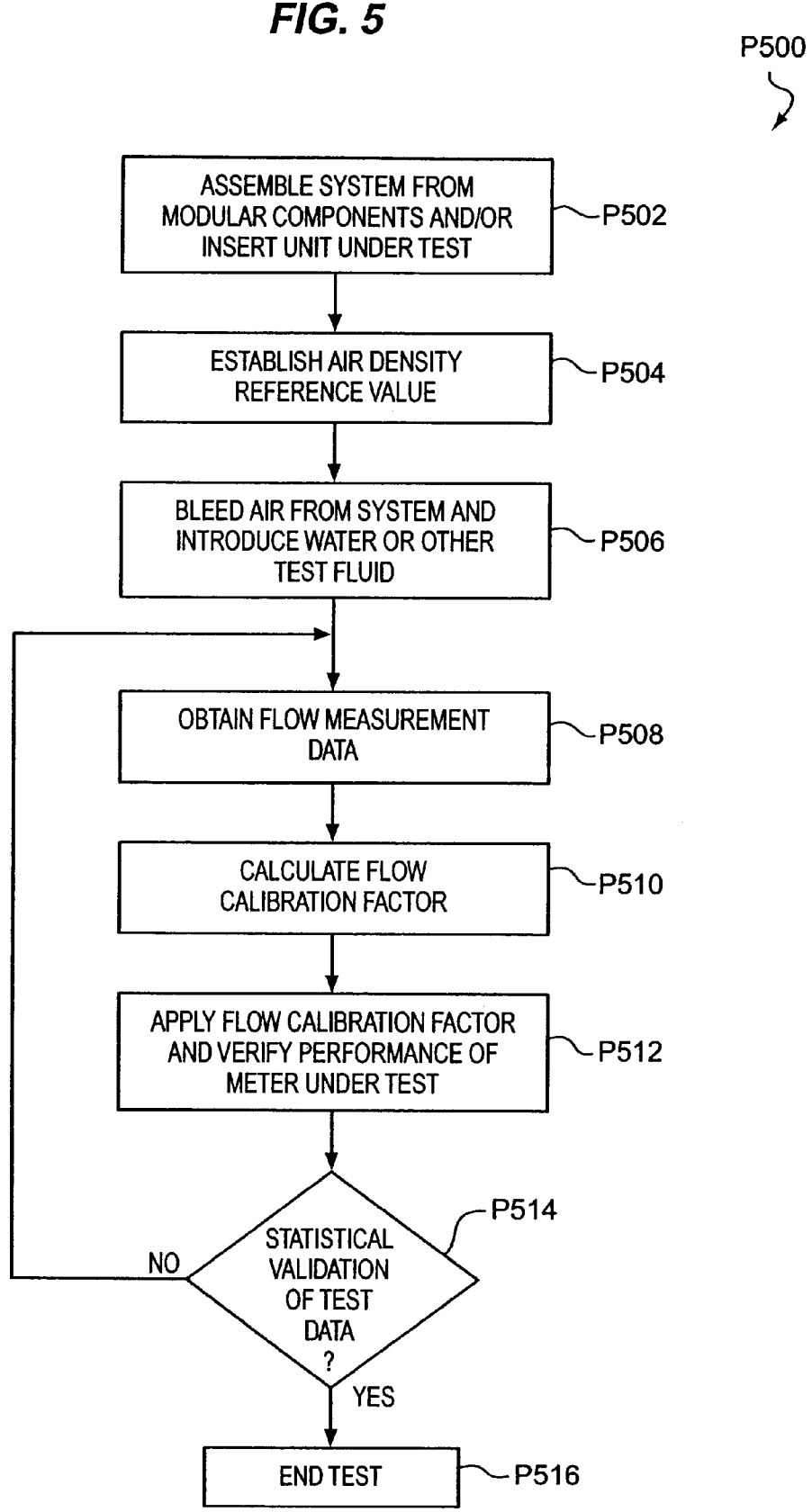
FIG. 5 is a process schematic diagram showing the operation of the FIG. 1 system.

FIG. 5 depicts a schematic block process diagram showing a process P500 of operating flow calibration system 100. The discussion of FIG. 5 is framed in the context of reference numbers from FIGS. 1–3.

Step P502 entails assembling flow calibration system 100 from its respective modular components, if such assembly is required, and inserting a unit under test. This assembly typically include bolting flanges together at the point where the subassemblies are separated. The respective modular components typically include a frame or other structure supporting first flowmeter array 112 and second flowmeter array 116, and may also include any liquid supply means, such as pump 106 together with reservoir 102. The supply means could also be a flange or valve connection to a city water supply, pressurized air or any other source of fluid.

Test unit 114 is typically held in place between tubular segments 118 and 120 by a hydraulically or pneumatically actuated pressure clamping device or by bolting the unit under test into place between flanges on tubular segments 118 and 120. Controller 122 closes automated valves 232 and 307 prior to the time when test unit 114 is removed.

Test unit 114 is normally filled with air after the unit under test has been properly installed in step P502. A pressurized air source is used to blow liquid from the system, if needed, prior to determining an air density reference value from each individual meter in the test unit 114, pursuant to step P504.

According to step P506, air is next bled from the system and water or another test fluid is introduced into the test unit 114. The test fluid can be air, in which case air does not need to be bled from the system and step P506 can be skipped.

Controller 122 opens automated valves 232, 304, and 306, and uses liquid from pump 106 to drain the test unit 114 prior to opening automated valve 307. This action prevents gas from being introduced into second flowmeter array 116. Alternatively, controller 122 can open valves 232, 300, and 302 for return of fill liquid to reservoir 102 if residual fluid and/or particles inside test unit 114 are not considered to contaminate the fluid in the reservoir.

In step P508, controller 122 activates pump 106 to flow water from reservoir 102 or permits fluid from another source to flow fluid through flow calibration systems 100. Controller 122 also determines the flow rate for the calibration test based upon operator input identifying the type or types of meters in the unit under test and a lookup table or database of appropriate test profile information for each meter. The operator can also input the test profile information to override or supplement test profile information in the database. Controller 122 then selectively opens and closes the automated valves 208, 210, 212, 214, 310, 312, 314, 316, 332, 334, 336, and 338 to match the test profile with meters from the first and second array that are capable of obtaining the 3:1 or other rule of thumb advantage in uncertainty over the meters in the test unit 114.

Controller 112 is preferably configured to obtain simultaneous readings from each active meter in first flowmeter array 112, second flowmeter array 116, and the test unit 114. This synchronization avoids the possibility that pressure surges through the system 100 could skew the measurement results if controller 122 polls the respective meters at different times. This flow measurement data can be quickly obtained, e.g., seven measurement points can be obtained in two to three minutes.

In step P510, the flow measurement data from second flowmeter array 116 is used to calculate a flow calibration factor or calibration equation that is compatible with the type of meter under test in test unit 114. The flow calibration factor calculation is performed according to the manufacturer's specifications, and the manner of this calculation is preferably kept in the same database or lookup table that is used to identify the test profile in step P508.

Step P512 entails additional flow measurement testing to verify performance of the meter under test using the flow calibration factor that was calculated in step P510. Controller 122 again synchronizes measurements from all of the active meters in flow calibration system 100.

In step P514, the controller 122 checks each measurement signal from steps P508 and P512 and compares the cumulative signals (e.g., representing total flow rate amounts from two meters in first flowmeter array 112) that are obtained from one array at a single time against the cumulative signals from the other array at the same time. The comparison entails subtracting one signal from the other and determining whether the difference exceeds an uncertainty delimiter that is required to obtain the desired rule of thumb advantage.

For example, assume that first flowmeter array 112 includes three active meters A, B, and C, and these meters provide flowrates that total to an amount D. Similarly, second flowmeter array 116 includes three active meters E, F and G, and these meters provide flowrates that total to an amount H, all at a single measurement time. The absolute value difference |D−H| expressed as a percentage of the total flow rate G for the second flowmeter array 116 must be equal to or less than the required rule of thumb advantage in uncertainty, or else controller 122 returns to step P508. If the uncertainty is equal to or less than the required rule of thumb advantage then the test ends in step P516.

Determination of Rule of Thumb Advantage In Uncertainty

Prior to use in the flowmeter calibration system 100, each flowmeter in the first and second flowmeter arrays 112 and 116 is typically calibrated on a conventional gravimetric flowmeter calibration stand. The uncertainty of the gravimetric stand is determined according to equation (1):

$$U_{G1} = (U^2_{AG1} + U^2_{BG1})^{1/2}, \tag{1}$$

where $U_{G1}$ is the uncertainty of the gravimetric stand, $U^2_{AG1}$ is the type A or random uncertainty of the gravimetric stand, and $U^2_{BG1}$ is the type B systematic uncertainty of the gravimetric stand. $U_{AG1}$ and $U_{BG1}$ are determined at the 95% confidence level by the procedures given in ISO-5168.

When the meters that have been calibrated on the gravimetric stand are placed in use, e.g., in second flowmeter array 116, the type A uncertainties of both the meters and the gravimetric stand must be considered. This is done according to equation (2):

$$U_{T1} = (U^2_{AM1G1} + U^2_{BG1})^{1/2}, \tag{2}$$

where $U_{T1}$ is the uncertainty of the test stand, $U^2_{AM1G1}$ is the type A uncertainty of the test stand and the gravimetric stand in combination, and $U^2_{BG1}$ is defined above. These uncertainties are combined as described in ISO-5168.

EXAMPLE 1

Working Calculation

Flow measurement data was collected under test using two Micro Motion CMF100™ sensors fitted with Model 9739 transmitters. The sensors were connected in series with a ten inch spacer between the respective sensors. The data included ten sets of ten runs or 100 points per flow rate per flow stand. Four different flow stands were used, with two flow stands being diverter gravimetric stands and the other two stands being SSF gravimetric stands. An analysis of the data showed that $U_{AM1G1}$ or the type A uncertainty of the meters under test was ±0.015% over a usable range with 95% confidence.

Solving Equation (2) for $U_{BG1}$:

$$U_{BG1} = (U^2_{T1} + U^2_{AM1G1})^{1/2} \tag{3}$$

Substituting $U_{T1}$=0.033 (⅓ of 0.10% manufacturer's accuracy specification) and $U_{AM1G1}$=0.015, Equation (3) is solved to yield $U_{BG1}$=0.029%, i.e., with the CMF100™ meters that were tested, a gravimetric stand with a type B uncertainty of 0.029% or less is required to calibrate test unit flowmeters having a ±0.10% manufacturer's accuracy specification.

Those skilled in the art will understand that the preferred embodiments described above may be subjected to apparent modifications without departing from the true scope and spirit of the invention. The inventors, accordingly, hereby state their intention to rely upon the Doctrine of Equivalents, in order to protect their full rights in the invention.

What is claimed is:

1. A flowmeter calibration system configured to calibrate a meter under test, comprising:
   a first flowmeter array configured to generate a first flow measurement signal;
   a second flowmeter array configured to generate a second flow measurement signal;
   a controller configured to process said first flow measurement signal and said second flow measurement signal to determine an accuracy of said second flowmeter array and process said second flow measurement signal to calibrate said meter under test; and
   when in use, said first flowmeter array and said second flowmeter array are connected to form a series connection with said meter under test and a fluid supply so that a fluid flows from said fluid supply and through said first flowmeter array, said second flowmeter array, and said meter under test.

2. The flowmeter calibration system as set forth in claim 1 wherein said first flowmeter array and said second flowmeter array each include a plurality of Coriolis flowmeters connected to flow in parallel.

3. The flowmeter calibration system as set forth in claim 2 wherein said plurality of Coriolis flowmeters in said first flowmeter array includes Coriolis flowmeters having different flow capacities.

4. The flowmeter calibration system as set forth in claim 3 wherein said plurality of Coriolis flowmeters in said second flowmeter array includes Coriolis flowmeters having different flow capacities.

5. The flowmeter calibration system as set forth in claim 4 wherein each meter of said plurality of Coriolis flowmeters having different flow capacities in said first flowmeter array is substantially identical to a corresponding meter of said plurality of Coriolis flowmeters having different flow capacities in said second flowmeter array.

6. The flowmeter calibration system as set forth in claim 5 wherein said controller is further configured to perform a statistical comparison between said first flow measurement signal received from said first flowmeter array and said second flow measurement signal received from said second flowmeter array to assure that flow measurements performed by said second flowmeter array are within an acceptable limit for use as standard meter calibration measurements.

7. The flowmeter calibration system as set forth in claim 6 wherein said acceptable limit includes at least a ninety-five percent certainty that the flow measurements performed by said second flowmeter array are at least about three times more certain than an accuracy specification of said meter under test.

8. The flowmeter calibration system as set forth in claim 7 wherein said accuracy specification of said meter under test is equal to or greater than 0.1 percent of a total flow measurement value and said acceptable limit is equal to or less than 0.03 percent of said total flow measurement value.

9. The flowmeter calibration system as set forth in claim 6 wherein said controller is further configured to compare flow measurement signals between identical meters in each of said first flowmeter array and said second flowmeter array.

10. The flowmeter calibration system as set forth in claim 6 wherein said controller is further configured to accumulate totals for flow from all active meters in each of said first flowmeter array and said second flowmeter array prior to performing said statistical comparison.

11. The flowmeter calibration system as set forth in claim 2 wherein said meter under test is a Coriolis flowmeter.

12. The flowmeter calibration system as set forth in claim 1 wherein said controller is further configured to perform a statistical comparison between said first flow measurement signal received from said first flowmeter array and said second flow measurement signal received from said second flowmeter array to assure that flow measurements performed by said second flowmeter array are within an acceptable limit for use as standard meter calibration measurements.

13. The flowmeter calibration system as set forth in claim 12 wherein said acceptable limit includes at least a ninety-five percent certainty that the flow measurements performed by said second flowmeter array are at least about three times more accurate than an accuracy specification of said meter under test.

14. The flowmeter calibration system as set forth in claim 13 wherein said accuracy specification of said meter under test is equal to or greater than 0.1 percent of a total flow measurement value and said acceptable limit is equal to or less than 0.03 percent of said total flow measurement value.

15. The flowmeter calibration system as set forth in claim 1 wherein flowmeters of said first flowmeter array and said second flowmeter array fall in the same class of flowmeter as said meter under test.

16. The flowmeter calibration system as set forth in claim 15 wherein said controller is further configured to selectively adjust flow rates through meters of said first flowmeter array and said second flowmeter array until said flow rates fall within a range of optimum accuracy corresponding to said meters.

17. The flowmeter calibration system as set forth in claim 1 wherein meters in said first flowmeter array and said second flowmeter array are capable of performing mass flow rate measurements, density measurements, and density measurements for contemporaneous calibration of these values in said meter under test.

18. The flowmeter calibration system as set forth in claim 1 including a test unit comprising a series of meters under test configured to transmit substantially simultaneous flow measurement signals from each meter.

19. The flowmeter calibration system as set forth in claim 1 formed in modular sections for ease of transportation and storage.

20. A method of flowmeter calibration for calibrating a meter under test, the method comprising the steps of:
    connecting a first flowmeter array and a second flowmeter array to form a series connection with said meter under test;
    supplying a fluid to use in flow calibration measurements through said first flowmeter array, said second flowmeter array, and said meter under test;
    measuring flow characteristics of said fluid through said first flowmeter array to generate a first flow measurement signal;
    measuring flow characteristics of said fluid through said second flowmeter array to generate a second flow measurement signal;
    processing said first flow measurement signal and said second flow measurement signal to determine an accuracy of said second flowmeter array; and
    processing said second flow measurement signal to calibrate said meter under test.

21. The method of claim 20 wherein each of said measuring steps includes use of Coriolis measurements to determine mass flow rate.

22. The method of claim 21 wherein each of said measuring steps involving use of said first flowmeter array and said second flowmeter array include flowing said fluid through a plurality of Coriolis flowmeters in parallel through each array.

23. The method of claim 22 wherein said step of flowing said fluid through said plurality of Coriolis flowmeters in parallel includes flowing said fluid through said plurality of said Coriolis flowmeters having different flow capacities in said first flowmeter array.

24. The method of claim 22 wherein said step of flowing said fluid through said plurality of Coriolis flowmeters in parallel includes flowing said fluid through said plurality of said Coriolis flowmeters having different flow capacities in said second flowmeter array.

25. The method of claim 24 wherein said step of processing said first flow measurement signal and said second flow measurement signal includes performing a statistical comparison between said first flow measurement signal and said second flow measurement signal to assure that flow measurements performed by said second flowmeter array are within an acceptable limit for use as standard meter calibration measurements.

26. The method of claim 25 wherein said acceptable limit includes at least a ninety-five percent certainty that the flow measurements performed by said second flowmeter array are at least about three times more accurate than an accuracy specification of said meter under test.

27. The method of claim 25 wherein said accuracy specification of said meter under test is equal to or greater than 0.1 percent of a total flow measurement value and said acceptable limit is are equal to or less than 0.03 percent of said total flow measurement value.

28. The method of claim 25 wherein said step of performing said statistical comparison further comprises comparing flow measurement signals between identical meters in each of said first flowmeter array and said second flowmeter array.

29. The method of claim 20 wherein said meter under test is a Coriolis flowmeter.

30. The method of claim 20 wherein said step of processing said first flow measurement signal and said second flow measurement signal includes performing a statistical comparison between said first flow measurement signal and said second flow measurement signal to assure that flow measurements performed by said second flowmeter array are within an acceptable limit for use as standard meter calibration measurements.

31. The method of claim 30 wherein said acceptable limit includes at least a ninety-five percent certainty that the flow measurements performed by said second flowmeter array are at least about three times more accurate than an accuracy specification of said meter under test.

32. The method of claim 31 wherein said accuracy specification of said meter under test is equal to or less than 0.1 percent of a total flow measurement value and said acceptable limit is equal to or less than 0.03 percent of said total flow measurement value.

33. The method of claim 20 wherein all flowmeters used in each of said measuring steps fall in the same class of flowmeter.

\* \* \* \* \*

UNITED STATES PATENT AND TRADEMARK OFFICE
CERTIFICATE OF CORRECTION

PATENT NO. : 6,360,579 B1
DATED : March 26, 2002
INVENTOR(S) : Robert J. DeBoom et al.

It is certified that error appears in the above-identified patent and that said Letters Patent is hereby corrected as shown below:

Column 8,
Line 30, replace "source to flow fluid through flow calibration systems 100."
with -- source to flow fluid through flow calibration system 100. --

Signed and Sealed this

Eighteenth Day of February, 2003

JAMES E. ROGAN
*Director of the United States Patent and Trademark Office*